No. 779,286. Patented January 3, 1905.

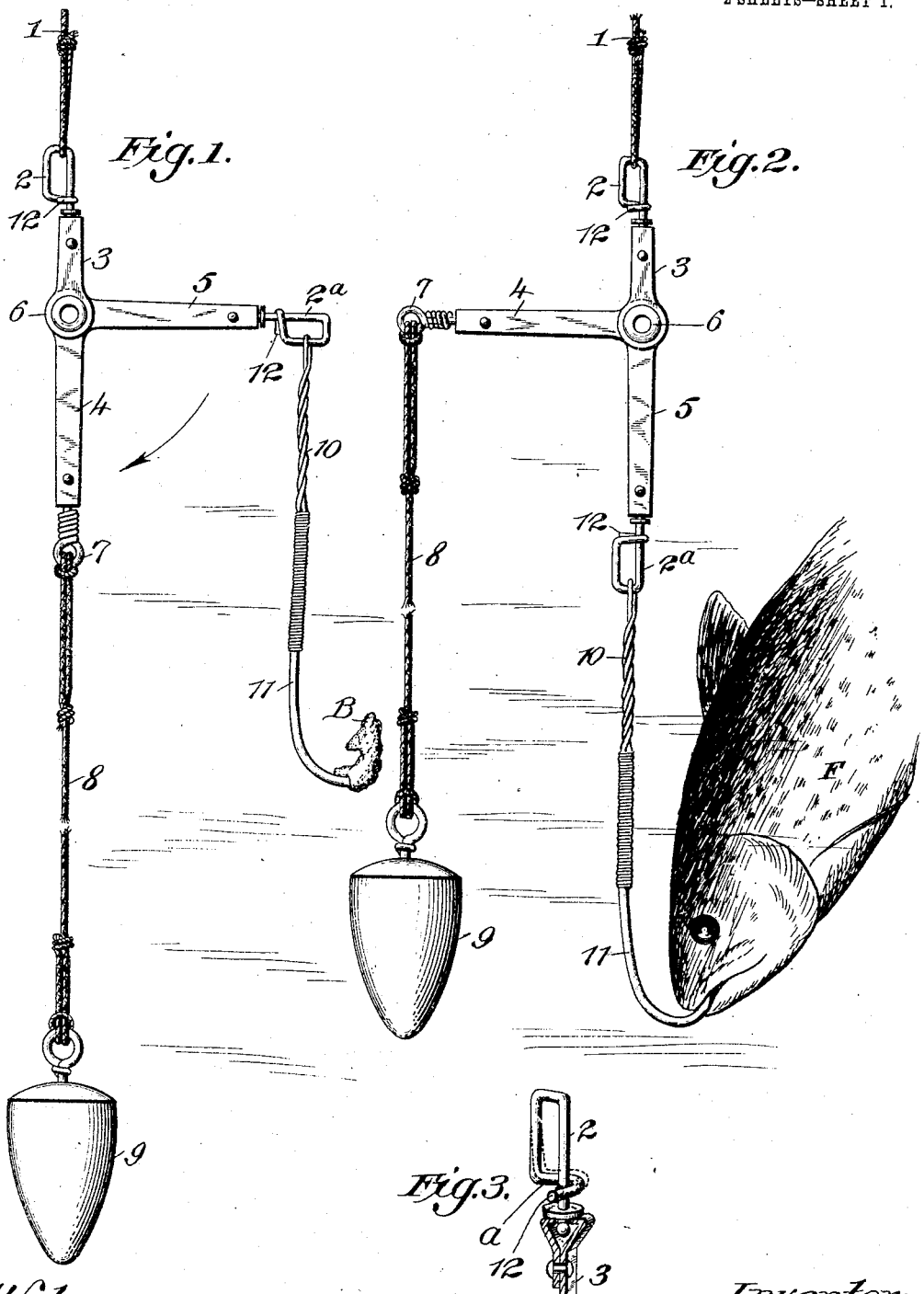

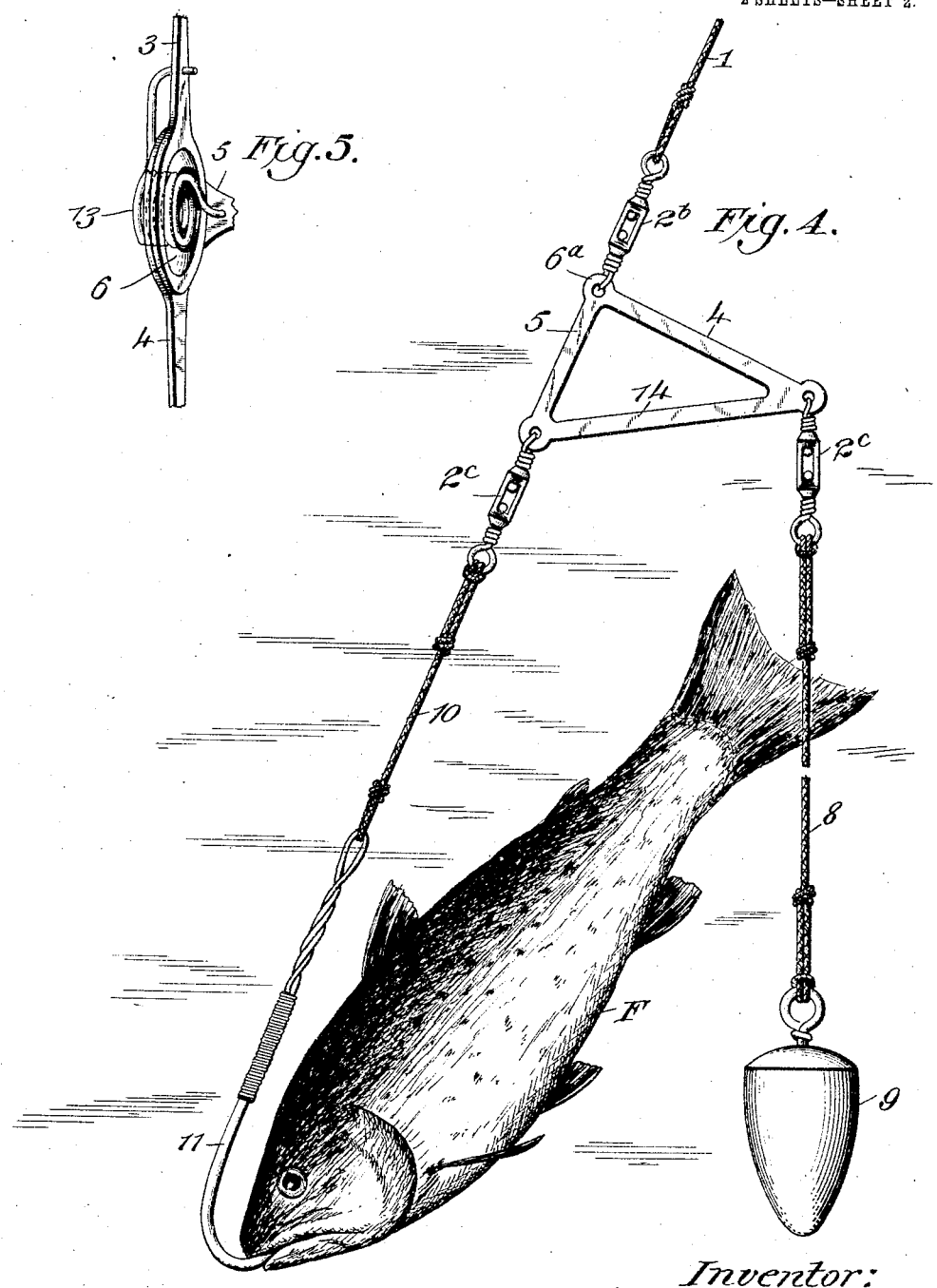

UNITED STATES PATENT OFFICE.

WILLIAM KRAMER, OF BROOKLYN, NEW YORK.

FISHING-TACKLE.

SPECIFICATION forming part of Letters Patent No. 779,286, dated January 3, 1905.

Application filed May 27, 1904. Serial No. 210,091.

*To all whom it may concern:*

Be it known that I, WILLIAM KRAMER, a citizen of the United States, residing in the borough of Brooklyn, in the county of Kings, in the city and State of New York, have invented certain new and useful Improvements in Fishing-Tackle, of which the following is a specification.

This invention relates to tackle for fishing where a line and sinker is employed; and it has for its object to provide a rocker to connect the snell of the hook and the cord of the sinker with the line held by the angler, the arms of the rocker being provided by preference with swiveled connections at their ends and with bails, such as will be hereinafter described, for connecting the looped snell and the sinker-line to the rocker.

In the accompanying drawings, which illustrate embodiments of the invention, Figure 1 is a view showing the device as it appears when under control of the sinker, and Fig. 2 is a similar view showing the parts as they appear when a fish has seized the bait and put a strain on the line. Fig. 3 is a perspective sectional view detached of the line-securing bail. Fig. 4 illustrates a somewhat-modified form of the rocker, but otherwise corresponding to Fig. 2. Fig. 5 is a detail view, on a large scale, showing another slight modification which will be hereinafter described.

Referring, primarily, to the first three figures of the drawings, 1 designates the angler's line, which may come from a reel or directly from the rod, as the case may be, or it may be simply held in the hand. This line is coupled through the medium of an open swiveled bail 2 and link 3 with a rocker, which is in the form of an elbow-lever and comprises two arms 4 and 5, rigidly connected together and pivotally connected to the link 3 by a rivet 6 at their point of junction. Preferably the arms of the rocker will be formed integrally from sheet metal and will be disposed at right angles to each other by preference. They may be of the same length or may vary somewhat in length. To the arm 4 is attached, through a swivel-bail or a ring 7, the cord 8, to which is secured the sinker 9, and to the arm 5 is attached, through the bail 2ª, the snell or line 10, to which is secured the hook 11. The lines 8 and 10 may of course be of any desired length. The length shown in the drawings is no criterion in this respect.

It will be noted that, as seen in Fig. 1, where there is no fish on the hook the sinker 9 is free to exert its pull and in consequence the rocker, which turns freely about the pivotal point or rivet 6, will be so turned that the arm 4, link 3, and lines 1 and 8 will be in perfect alinement, while the arm 5 will be held out at right angles therefrom, thus keeping the hook free from entanglement with the sinker-line; but when a fish, as F in Fig. 2, strikes the bait B and throws a strain on the line 1 greater than that exerted by the sinker the rocker will be turned about its pivot and the arm 5 put into alinement with the link 3, the snell 10, and the line 1, while the arm 4 swings the sinker and its line out to one side. Thus it will be seen that while the advantage of keeping the hook clear of the sinker is attained by the pivoted rocker the advantage is also attained of a direct pull on the line when the fish is hooked, the rocker serving to bring into alinement with the line 1 either the line 8 or snell 10, as occasion requires.

The bails 2 and 2ª, which are or may be alike, have swivel connections with the link 3 and arm 5, respectively, so that they may turn axially on their stems, and thus prevent the twisting up or stranding of the lines. Referring to Fig. 3 for illustration, it will be noted that the bail is made of looped wire and is open at the point *a* in this figure, so that the loop formed at the end of the line 1 and snell 10 may be made to engage the wire bail and may be disengaged therefrom very readily, yet accidental disengagement is nearly impossible. By the word "open," as here used to characterize the looped bail, is meant the capability of engaging the loop of the bail with the loop of the line or snell by simply springing back the curved end of the wire, as indicated by dotted lines in Fig. 3. This open bail is formed by bending the free end 12 of the wire rather loosely about the stem of the bail, as clearly shown. The spring of the wire enables the line or snell to pass with sufficient freedom, as indicated in dotted lines. The ring or bail 7 for the sinker line or cord may be of the same form as the bail 2, if preferred.

As the normal position of the arms 4 and 5 of the rocker is that shown in Fig 1, the device may have a light spring at the pivot 6 to hold the rocker normally in its position. Such a construction is shown in Fig. 5, wherein 13 is a coil-spring in the hollow rivet or eyelet at 6, the ends of which are secured one to the arm 5 and the other to the link 3. When the arm 5 is drawn into alinement with the link, this spring will be put under some tension. Such a spring would be useful where in fishing the sinker rests on the bottom.

Fig. 4 shows a construction which is the same in principle, but differs somewhat in construction from the device seen in the principal views. In this form the rock is triangular, the arms 4 and 5 being connected by a tie 14, and the turnbuckle $2^b$ on the line 1 is connected directly with the rocker at a hole $6^a$, situated at the pivotal point of the rocker.

It should be observed that to get the result sought by the rocker above described the angle between the arms which best serves the purpose is ninety degrees; but obviously good results may be obtained when this angle is somewhat less or somewhat more than ninety degrees. Hence the invention is not strictly limited to a right angle between the arms 4 and 5.

The rivet 6 may be an eyelet or solid rivet. In Fig. 4 the turnbuckle $2^b$ and the aperture $6^a$ in the rocker are operative equivalents of the rivet 6, link 3, and bail 2 of the principal views. The cord 8 and snell 10 of Fig. 4 are shown as coupled to the respective ends of the rocker by turnbuckles $2^c$, similar to the turnbuckle $2^b$.

Having thus described my invention, I claim—

1. In fishing-tackle, a rocker having means for connecting it pivotally with an angler's line, and having two arms disposed at an angle to each other, one arm for the attachment of the hook and the other for the attachment of the sinker.

2. In fishing-tackle, a rocker having two arms disposed at an angle to each other and provided at their ends with swiveled bails for the attachment, respectively of the hook and sinker, and a link pivotally attached to the rocker and provided with a swiveled bail for the attachment of the angler's line.

3. In a fishing-tackle, the combination with a rocker having two arms 4 and 5, disposed at an angle to each other, of a link 3, pivotally attached to said rocker at the junction of the arms thereof, an open bail 2, having a swiveled connection with the link 3, an open bail $2^a$, having a swiveled connection with the arm 5, a sinker and its line, and means for connecting the sinker to the arm 4.

In witness whereof I have hereunto signed my name, this 19th day of May, 1904, in the presence of two subscribing witnesses.

WILLIAM KRAMER.

Witnesses:
 HENRY CONNETT,
 BENJAMIN HOLT.